Oct. 21, 1930.  A. J. KLONECK  1,778,897
SIGNALING APPARATUS
Filed May 18, 1923
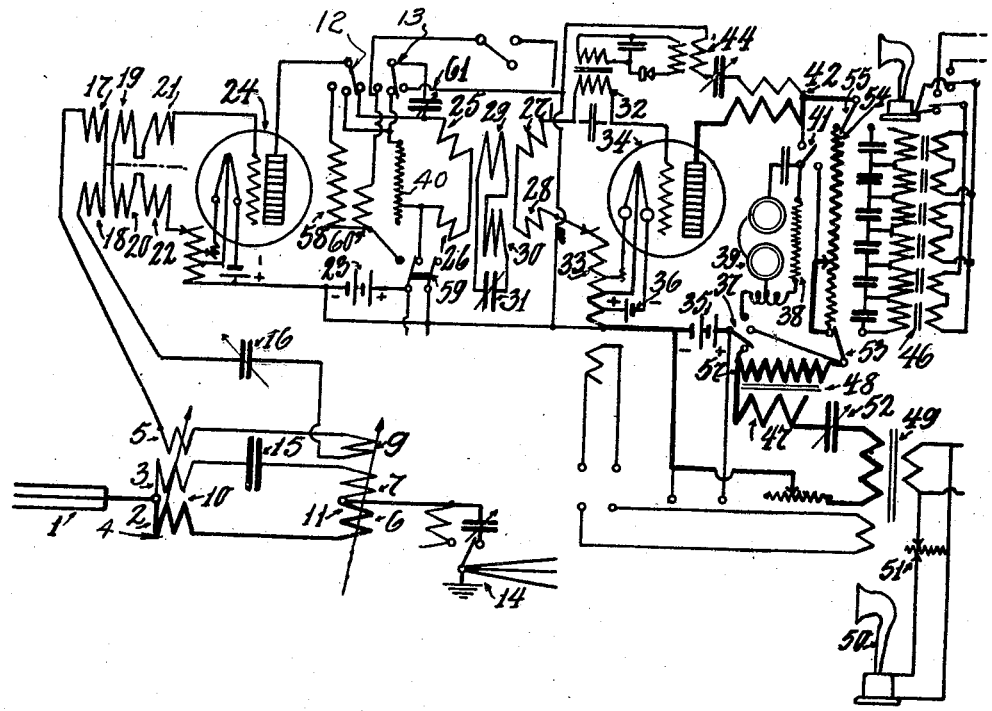
WITNESSES.
Anna Browner
Irving Browner
INVENTOR.
August J. Kloneck Patented Oct. 21, 1930

1,778,897

UNITED STATES PATENT OFFICE

AUGUST J. KLONECK, OF NEW YORK, N. Y.

SIGNALING APPARATUS

Application filed May 18, 1923. Serial No. 639,819.

This invention relates to systems and means for receiving electrical signals and more particularly to improvements in the utilization of amplifying devices such as the so-called electron tubes of relatively small capacity for an operation with currents of large values.

This object, as well as other allied objects hereinafter appearing, are realized in accordance with the arrangement disclosed in the following description and illustrated in the accompanying drawing in which:—

The illustrated figure represents a diagrammatic arrangement of circuits and elements for receiving electrical signals through similar apparatus and principles as herein disclosed.

Referring to the illustrated figure, 1 designates an aerial of a radiation circuit including a ground 14 or a counterpoised aerial as desired. The aerial will be tuned in the conventional manner. Said radiation circuit forms two branch circuits. Said branch circuits and the cooperating local circuits include each a coil upon two transformers 10 and 11, including the coils 2 and 6 in one of said branch circuits; while the coils 3 and 7 including a condenser of comparatively large capacity 15 are arranged in the other branch circuit and the coils 5 and 9 in the local circuit for receiving signals. The large condenser 15 further prevents a direct flow of a current from one of said branch circuits through the other or receiving branch of the aerial circuit but permits a flow of current received by the aerial circuit, since a small capacity of the aerial circuit will render the large capacity of the condenser 15 in the branch circuit ineffective.

The coils 5 and 9 for one of said local circuits are connected in series with two coils 17 and 18 of a receiving circuit including a tuning condenser 16. In an inductive connection with coils 17 and 18 are two pairs of secondary coils 19, 21 and 20, 22 arranged in the well known manner for forming a variable inductance. The coils 21 and 22 are connected to a grid and to a filament of an amplifying device or electron tube 24 of preferable low internal impedance for permitting an operation of the same at a low voltage. The anode or plate of the amplifying device is connectable through two separate primary coils 25 and 26 by a suitable switch arrangement including switches 12, 13 and 59 to the battery or other source of current 23 and the filament of said amplifying device 24. In the illustrated positions of the switches the primary coils 25, 26 are connected in series with the plate of the thermionic relay 24. In the right hand position of switch 13 the condenser 61 is connected across the plate and filament of the amplifying device. The central position of switch 13 connects the condenser 61 and a resistance in multiple to the primary coils. The central position of switches 12 and 13 connects the primary coils in series with condenser 61 and in multiple with the high resistance 40, occasioning a flow of current through the primary coils only during an operation of the amplifying device by received signal energy. The left hand position of switches 12, 13 and 59 connects a coil 58 of a large number of turns between the battery 23 and the plate of the amplifying device while the primary coils 25, 26 are connected in series with condenser 61 and a coil of a few number of turns 60 in multiple to the battery 23 and the amplifying device 24. The coil 58 has preferably twice the inductance value of coil 60 in compensation of the reactance of the other elements in the circuit with coil 60 to permit a flow of current and a charging and discharging of condenser 61 at about the same frequency. In this case the inductance of the coils may be varied by changing the diameter of the coils regardless of employing a different relation in the number of turns of said coils.

The primary coils 25 and 26 are coupled to an intermediate tuning circuit including the coils 29 and 30 and a condenser 31. Two secondary coils 27 and 28 are inductively connected with coils 29 and 30 but arranged at right angles with respect to coils 25 and 26 so as to prevent a direct inductive coupling between the primary and secondary coils. One terminal of coil 28 is connected through a coil 33 to the filament of another amplifying device 34. The other terminal of coil 28 is connected through coil 27 and the secondary of an iron core or low frequency transformer 32 to the grid of said amplifying device 34. A source of current 35 is connected between the filament or cathode circuits and elements of tube 34 and a switch 37. The latter has three switch points; the lowest shown switch point thereof connects through two coils of a transformer 48 including coils 47 and 57. Coil 47 consists of few turns of heavy or low resistance wire and connects through a tuning condenser 52, then through the primary of an output transformer 49 and a current-varying resistance to the tube-filament circuits. The output transformer 49 is shown operating a loudspeaker 50 through a variable resistance 51. Coil 57 of the transformer 48 consisting of many turns of wire or 10 times as many turns as that of coil 47 for instance. The circuit then continues through a switch 53, a high resistance 54, switch 55, and then branches through two coils of a transformer 42. One coil of the latter is connected to the plate of the amplifying device 34. The other coil has about twice the number of turns with respect to the first mentioned coil and is connected through a condenser and the primary of an air core transformer 44 to the filament including the other terminal of the source of current 35. By throwing switches 53 and 55 to the right hand position the circuit between said switches embraces a plurality of transformers 46, having their primary coils connected in series with one another and the discharge plate of the electron tube 34. By utilizing such a plurality of transformers, the current drop will be distributed through several transformers as shown, while the increased impedance through the use of a plurality of such transformer permits the use of a greatly increased voltage in the plate without danger of overloading the tube, since the increased voltage is employed for operating two, three or six transformers. The output of said six transformers may thence be combined if desired to obtain an increased secondary current.

A condenser is connected in multiple to each of said coils of said transformers 46, for the purpose of making the reactance of all transformers connected in series with one another not larger than that of a single of said transformers. In using the last mentioned arrangement of transformers, the transformer 48 may be omitted by throwing switch 37 to the central position if desired. In the uppermost position of switches 41 and 37, they will form a circuit through an autotransformer and a resistance 38 to transformer 42; while a receiving instrument 39 is connected in series with a condenser and together in multiple to the resistance 38 and to an intermediate terminal of said autotransformer. The last mentioned arrangement prevents a flow of direct current through the receiving instrument 39 when no signals are received; but it permits a flow of current through the receiving instrument when signals are received as such oscillating signal currents, further amplified through the autotransformer will readily flow through the condenser and the receiving instrument. The action of the last mentioned autotransformer is similar to that of transformer 48, except that the coils are connected in series with each other instead of in multiple. The transformer 44 serves for changing the high frequency received signal currents to a low frequency current by means of the conventional circuits, including a detector and the audiotransformer 32 arranged in the grid circuit of the amplifying device 34.

The transformer 48 has the purpose of providing a path of low resistance for a heavy current to be utilized for operating loud talkers or other receiving instruments. Such heavy currents can not be obtained in a circuit with the amplifying device 34, since the latter has a space resistance of several thousands of ohms. The chief object of this arrangement is thus to utilize an amplifying device of a small capacity for providing a larger reaction than that as now usually obtained with such ampifying devices from a certain signal energy. Assuming that an amplifying device will operate only at a current value one milli-ampere satisfactorily, means are provided to dissipate the excessive voltage from the self inductive or magnetizing current of the comparatively large transformer 48 through said circuit by changing said currents to a high voltage but small current of the mentioned value of one milli-ampere and then adding sufficient resistance or the high impedance transformers 46 to the circuit, prior to said amplifying device.

The reactive or discharge currents from transformer 48 are limited to the desired one milli-ampere value through the additional resistance 54 or the high impedance transformer circuit 46 and thus dispersed. It is to be considered, that this dissipated current will only be a fraction of the total current flowing through transformer 48, since most of the current will be used for operating said loud talkers or other translating devices. The transformer coil 33 has its end terminals connected between the coil 28 and the source of current 35. Intermediate terminals of said coil 33 are connected to the filament of said amplifying device 34 and a filament heating battery 36 in a manner so that the positive terminal of battery 36 is connected to the negative terminal of the source of current 35. The purpose of coil 33 is to produce a positive biasing current at the grid when the current from the source 35 flows through the lower part thereof by a discharge from the plate of said amplifying device toward its filament and thus, it will support a discharge through said amplifying device 34. In some respects, there are many purposes the coil 33 will attain; it will produce a counterelectromotive force to a grid current tending to flow through the grid-plate capacity of the amplifying device; it may produce a slight regenerative effect with the flow of plate current, while the filament battery 36 may be connected to the coil 33 in a manner so as to produce a continued magnetic field which is disturbed by grid and plate currents but which by cessation of either one produces a similar or opposite effect upon either circuit as convenient or desired.

It will be noted that the coils of transformers 48, 42 and 74-75 are connected to the common terminal or to the source of current in a manner so that a current surging from said common terminal through one of said coils toward the amplifying device will produce a secondary current in the other coil of said transformers in the opposite direction or toward the common terminal. In this case, a reacting current from condenser 52 for instance, surging back toward the common terminal and the battery and through coil 47, will produce a secondary current in coil 57 in the same direction as that of the current from the battery surging through coil 57.

The described arrangement permits the use of a comparatively small amplifying device in a circuit with, for instance, a ten times higher voltage than that normally employed in connection with such amplifying devices. The excess voltage will be employed for operating the transformer circuits, while the amplifying device will be loaded only with a voltage equal to the normal capacity of such amplifying devices.

It will be obvious that the general principles herein disclosed may be embodied in many other organizations widely different from those illustrated, without departing from the scope of the invention as defined in the following claims.

What is claimed as new is the following:—

1. In a signaling system, a stage of amplification, operating circuits and cooperating elements therefor including a source of current, a discharge device having input and output circuits including terminals, a reacting coupler having two coils connected together with one of their ends and through said source of current to one terminal of said output circuit of said discharge device, the other terminal of said output circuit connects to the free end of one of said mentioned two coils including impedance, the free end of the second mentioned coil of said coupler forms an operating circuit with reactances for operating in association with the input circuit adapted for increasing the reaction upon signal impulses by means of said coupler.

2. In a signaling system the combination with electric circuits and elements including a reacting transformer having two coils connected together with one of their similarly wound coil terminals to a circuit including a source of current and one terminal of the output circuit of one stage of amplification including electronic amplifying devices, the other terminal of said output circuit being connected through one of said coils of said reacting transformer, the other coil of said reacting transformer being connected to a coupling circuit with the input circuit of another stage of amplification and including capacity and inductance, means and elements for operating said circuits at the desired current frequencies for receiving and amplifying a desired signal current, said reacting transformer being adapted for inductively increasing the effective voltage drop in the shunted coupling circuit by current discharges in the output circuit of said first mentioned electronic amplifying device.

3. In a signaling system the combination, of electric circuits including an electronic amplifying device, the latter having input and output circuits, a source of current connected in said output circuits including a reacting transformer having two coils of different numbers of turns, said two coils have one of their similarly wound coil turns connected to said source of current, a signal currents coupling circuit for a desired purpose, means for connecting said coupling circuit with that coil of said reacting transformer having a less number of turns than the other coil, means for connecting the output circuit of said electronic amplifying device to the other coil of a high number of turns of said reacting transformer including elements of high impedance, and means for impressing a signal upon the input circuit of said amplifying device, all, for the purpose set forth.

4. In a signaling system, a stage of amplification including cooperating circuits and elements, an electronic amplifying device including an internal output circuit of high resistance and an external output circuit of a multiple of the resistance of said internal output circuit, the external output circuit of high resistance including suitable reactance and a source of high voltage current, the voltage of said source being chosen sufficiently high to compensate for the drop through the high resistance elements of said external output circuit, without the latter of which the electronic amplifying device would be overloaded, and means for utilizing the drop of voltage through said reactance elements of said output circuit, for the purpose set forth.

5. In a signaling system, a stage of amplification including cooperating circuits and elements, an electronic amplifying device including an output circuit, the latter including a plurality of transformers having primary coils connected in series with one another and with a source of current, the secondary coils of said plurality of transformers serving for furnishing increased output power for utilizing means, the voltage of said source being such so as to compensate for the drop through the use of said plurality of transformers and the additional resistance in the output circuit.

6. In a signaling system the combination with an electronic amplifying device having grid, plate and filament circuits including cooperating elements, of a transformer having a coil part thereof connected in said filament circuit and the end terminals between the grid and the plate circuits respectively, said transformer being adapted for producing a damping effect upon the oscillatory currents, surging through said grid circuit, all, for the purpose set forth.

In testimony whereof, I have signed my name to this specification this 14th day of May, 1923.

AUGUST J. KLONECK.